United States Patent [19]

Tash

[11] 3,792,708
[45] Feb. 19, 1974

[54] FLUID FLOW DIRECTOR
[76] Inventor: George Tash, 6539 Gaviota Ave., Van Nuys, Calif. 91406
[22] Filed: June 16, 1971
[21] Appl. No.: 153,585

Related U.S. Application Data
[63] Continuation-in-part of Ser. No. 108,436, Jan. 21, 1971, abandoned.

[52] U.S. Cl............................ 134/167 C, 137/525
[51] Int. Cl.......................... B08b 9/02, F16k 15/14
[58] Field of Search.... 134/167 C; 137/525, 624.14, 137/166 C; 138/93; 285/97, 107

[56] References Cited
UNITED STATES PATENTS

| 2,818,880 | 1/1958 | Ratelband | 137/525 |
| 2,747,608 | 5/1956 | Grove | 137/525 |
| 1,745,304 | 1/1930 | Lemex | 137/513-7 |
| 3,595,255 | 7/1971 | Mulinex | 134/167 C |
| 2,598,122 | 5/1952 | Hansen | 137/525 |
| 3,146,460 | 9/1964 | Henderson | 137/525 X |
| 2,663,309 | 12/1953 | Filliung | 137/525 X |
| 1,848,269 | 3/1932 | Peterson | 134/167 C |
| 3,086,540 | 4/1963 | Anderson | 134/167 C |
| 2,098,886 | 11/1937 | Safford | 137/525 |
| 1,893,979 | 1/1933 | Barrere | 138/93 |

Primary Examiner—Alan Cohan
Assistant Examiner—Gerald A. Michalsky
Attorney, Agent, or Firm—Matthew P. Lynch

[57] ABSTRACT

A valved flushing device consisting of an elastomeric tube having one end adapted to be connected to a suitable source of water and having a valve disposed in its opposite end, the valve opening in response to the expansion of the elastomeric member into sealing engagement with the internal diameter of a pipe that it is desired to unclog. The alternate opening and closing of the valve due to pressure build up and release causing the valve to emit pulsating jets of high pressure water into the clogged pipe in order to dislodge the material clogging the pipe.

7 Claims, 4 Drawing Figures

INVENTOR:
GEORGE TASH
George Tash

INVENTOR:
GEORGE TASH
George Tash

GEORGE TASH
INVENTOR

BY Matthew P. Lynch
ATTORNEY

FLUID FLOW DIRECTOR

RELATED APPLICATIONS

This application is a continuation-in-part of application Ser. No. 108,436, filed Jan. 21, 1971, now abandoned, entitled "Fluid Flow Director," by George Tash.

BACKGROUND OF THE INVENTION

Waste pipes and sewers and the like often become filled with a solid or semi-solid foreign material which causes a stoppage of normal flow through the pipe but which can be dislodged and cleared by the application of pressure followed by a flow of clear water through the pipe. In order to build up sufficient pressure to dislodge the clogging material it is necessary to seal the end of the pipe into which the high pressure water is directed in order to prevent the water from taking the path of least resistance and exiting from the same end it enters. Many devices heretofore have provided to isolate hydraulically, a section of a clogged pipe so that hydraulic pressure may be built up between the water source and the foreign material which clogs the pipe. These prior art devices essentially consist of an elastomeric tube having a small orifice in its free end so that water will build up within the tube causing it to expand into sealing engagement with the internal diameter of the clogged pipe upstream of the stoppage. After the tube has expanded sufficiently to seal the pipe, the continued injection of water into the tube will cause some of the water to exit through the orifice, hopefully under sufficient pressure and volume to force the foreign material along the pipe until the pipe is cleared. A major disadvantage of the prior art devices has been the inability to control the volume or pressure of the fluid flow. This has been because, in order to provide sufficient pressure differential to cause the elastomeric tube to expand into sealing engagement, the orifice in the free end has had to be quite small and therefore, even after the tube has expanded, the volume of water capable of exiting has been extremely limited. The inability of the water to exit from the tube has caused additional problems in that the pressure within the tube increases to the tube burst pressure and the tube often ruptures. If the orifice is made large enough to provide for a sufficient volume of exiting water there is insufficient pressure differential to cause the tube to expand and seal the pipe. Another problem with prior art devices has been that the elastomeric tube tends to elongate in addition to expand laterally and therefore, the tube may burst before it seals the pipe.

SUMMARY OF THE INVENTION

The present invention overcomes the aforementioned problems by providing a flushing device having a valve in the free end thereof. The flushing device consists of an elastomeric tube, one end of which is adapted to be connected to a source of water and the opposite free end of which has a valve disposed therein. The valve is adapted to retard the exiting flow of water until the elastomeric tube expands into sealing contact with the internal wall of the clogged pipe, at which time the valve is automatically opened, allowing high pressure water in sufficient volume to impinge against the foreign material clogging the pipe. The action of the valve allows the exiting water under high pressure to pulse, thereby causing the foreign material to be subjected to repetitive pulses of high pressure water similar to hammer blows. The flushing device is also provided with a means for preventing the elastomeric tube from elongating while limiting its motion to lateral sealing expansion.

DESCRIPTION OF THE PREFERRED EMBODIMENTS

Figure 1:
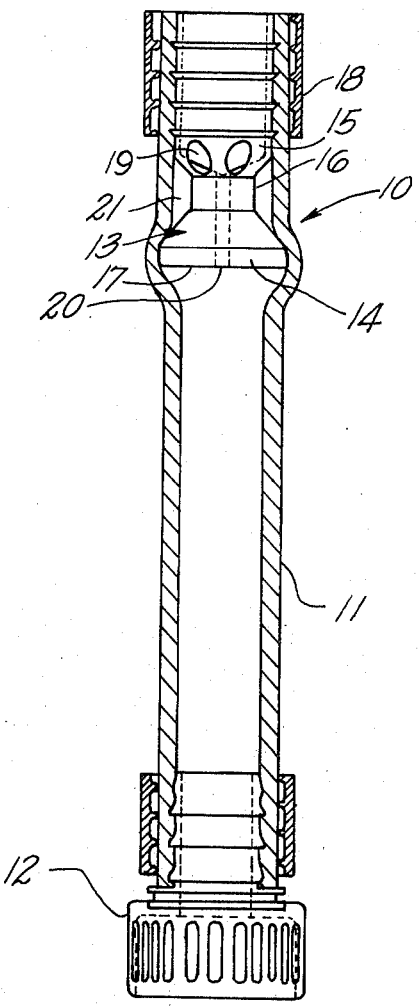
FIG. 1 is a cut-away view of the valved flushing device in its normal condition with the valve closed.

Referring now to the drawings, wherein like reference numbers designate like or corresponding parts throughout the several views, there is shown in FIG. 1 a flushing device 10 having an elastomeric tubular body 11. While the body 11 is preferably constructed of latex, it will be obvious to anyone skilled in the art that other elastic, flexible and resilient materials such as synthetic rubber, neopreme, plastisols and organosols may also be used. The body 11 is a hollow, flexible, resilient tubular member preferably molded to form. One end of the body 11 is secured to an inlet fitting 12 which is mounted thereon and connected thereto by mechanical swedging, which is well known and long used in the art to which this invention pertains.

Disposed within the opposite free end of the body 11 is a valve 13. The valve 13 is of a substantially hourglass configuration having a valve portion 14, an outlet portion 15 and a necked down portion 16 intermediate the valved and outlet portions. The valve portion 14 has a face plate 17 of solid construction having a diameter greater than the internal diameter of the body 11 and is disposed inwardly of the exit end of the body 11. The outlet portion 15 of the valve 13 is of hollow construction and is mechanically connected to the exit end of the body 11 by a swedged sleeve 18 which is slipped over the body 11 so that the body 11 is sandwiched between the outlet portion 15 and the sleeve 18. The necked down portion 16 interconnects the valve and outlet portions 14 and 15, respectively, to form an integral valve 13. The necked down portion 16 diverges outwardly to meet the valve and outlet portions and is solid except for the diverging portion, which connects with the outlet portion, which is hollow like the outlet portion. Disposed within the outlet connecting diverging portion are a plurality of openings 19. Extending co-axially through the valve portion 14 including the face plate 17 and the necked down portion 16 to communicate with the hollow diverging portion of the necked down portion 16 and the internal surface of the outlet portion 15, is an orifice 20. The orifice 20 has a predetermined diameter sufficient to allow the body 11 to rapidly expand upon the injection of water into the body through the inlet 12.

When in position, as shown in FIG. 1, the valve 13 extends inwardly from the exit end of the elastomeric body 11 so that the valve portion 14 of the valve 13 is disposed intermediate the ends of the body 11. Because the face plate 17 of the valve 13 has a diameter greater than the internal diameter of the body 11, the body 11 extends or stretches over the face plate 17 and then resumes its original diameter in the areas of the necked down portion 16 and on outward to encompass the outer diameter of the outlet portion 15 which has an external diameter complementary to the normal internal diameter of the body 11. Because of the stretching of the body 11 over the face plate 17 and the resiliency of the body 11, its tendency is to return to its original diameter as soon as it clears the face plate 17; however, the diverging portion of the necked down portion 16 also has a slightly larger diameter along a portion of its length than the body 11; therefore, the body 11 lies in contact with the circumference of the face plate 17 and a portion of the diverging portion of the necked down portion 16 due to its resiliency. The remainder of the necked down portion 16 has a diameter smaller than the internal diameter of the body 11, thereby providing a channel 21 between the internal diameter of the body 11 and the external diameter of the necked down portion 16. The channel 21 communicates with the hollow internal area of the outlet portion 15 through the openings 19.

Figure 3:
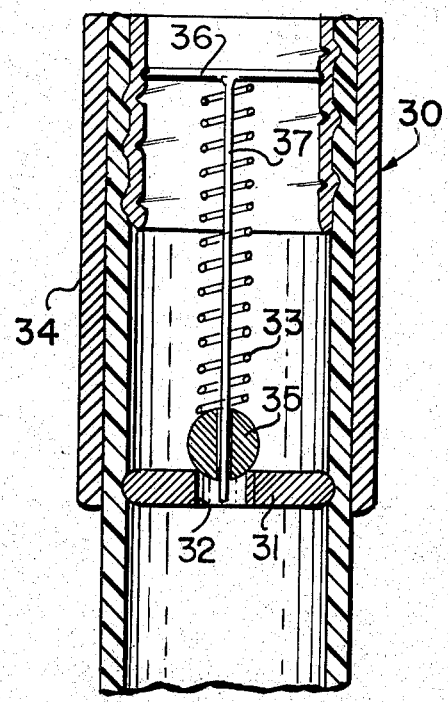
FIG. 3 is a cut-away view of an alternate type of valve.

Referring now to FIG. 3, there is shown an alternate valve 30. The valve 30 has a face plate 31 which is secured within the body 11 adjacent its exit end and has an orifice 32 disposed therein. The face plate 31 is maintained in position by a sleeve 34 which holds the body 11 in sandwiched engagement between the face plate 31 and the sleeve 34 by mechanical crimping force. Disposed intermediate the face plate 31 and the exit end of the body 11 is an anchor pin 36 which traverses the diameter of the body 11 and is secured by the sleeve 34. A guide rod 37 is secured to the anchor pin 36 and depends perpendicularly therefrom through the center of the orifice 32. Slidably disposed about the rod 37 is a ball seal 35 which is held in sealing relationship to the orifice 32 by the force of a coil spring 33 which is disposed about the rod 37 between the ball 35 and the anchor pin 36. The ball seal 35 is adapted to seal the orifice 32 under the pressure of the spring 33 and further adapted to open the orifice 32 when the pressure within the body 11 exceeds the force of the spring 33. When the pressure within the body 11 exceeds the spring force of the spring 33 the ball 35 will be forced away from the orifice 32 along the guide rod 37 against the force of the spring 33, thereby allowing water to exit through the orifice 32 and impinge against the foreign material blocking the pipe. The orifice 32 is sized to allow the most efficient amount of water under the highest pressure to exit therethrough and the spring 33 has a predetermined constant to allow the body 11 to fully expand into sealing contact before the pressure within the body would be sufficient to compress the spring and remove the ball seal 35 from the orifice. When the pressure within the body 11 drops the spring 33 causes the ball 35 to reseal the orifice 32 until the pressure once again increases to the required magnitude.

Figure 4:
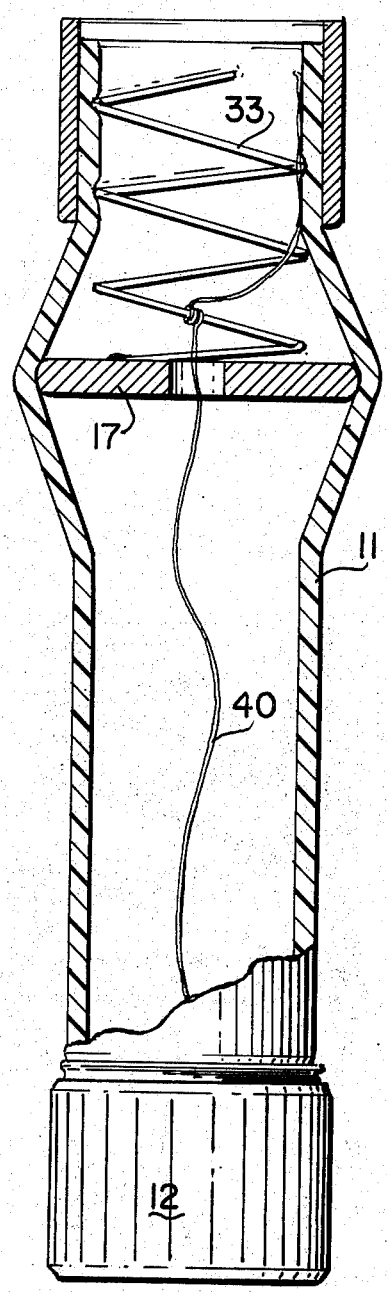
FIG. 4 is a cut-away view of the device showing its elongation limiting means.

Another alternate embodiment of the flushing device 10 is shown in FIG. 4, wherein the face plate 17 is attached to a spring 33. The spring 33 serves the dual purpose of allowing the face plate 17 to be held in position intermediate the ends of the body 11, while allowing water which passes around the face plate 17 when the body 11 expands to pass through the coils and out the exit end of the body.

FIG. 4 illustrates the means by which the body 11 is precluded from elongating while being allowed to expand laterally into sealing engagement with the internal diameter of the pipe to be unblocked. The elongation precluding means consists essentially of a string 40 which may be made of nylon, fiber, wire, cotton or any other suitable material which has sufficient strength and durability. The string 40 is connected to the inlet fitting 12 on one end and extends internally through the body 11 and the orifice of the face plate 17, where it is connected to the end of the body 11 or the valve 13. The string 40 has a small amount of slcak in order to allow the body 11 to expand a minimal amount and for ease of installation but its sole purpose is to preclude the body 11 from elongating while allowing it to expand laterally.

Figure 2:
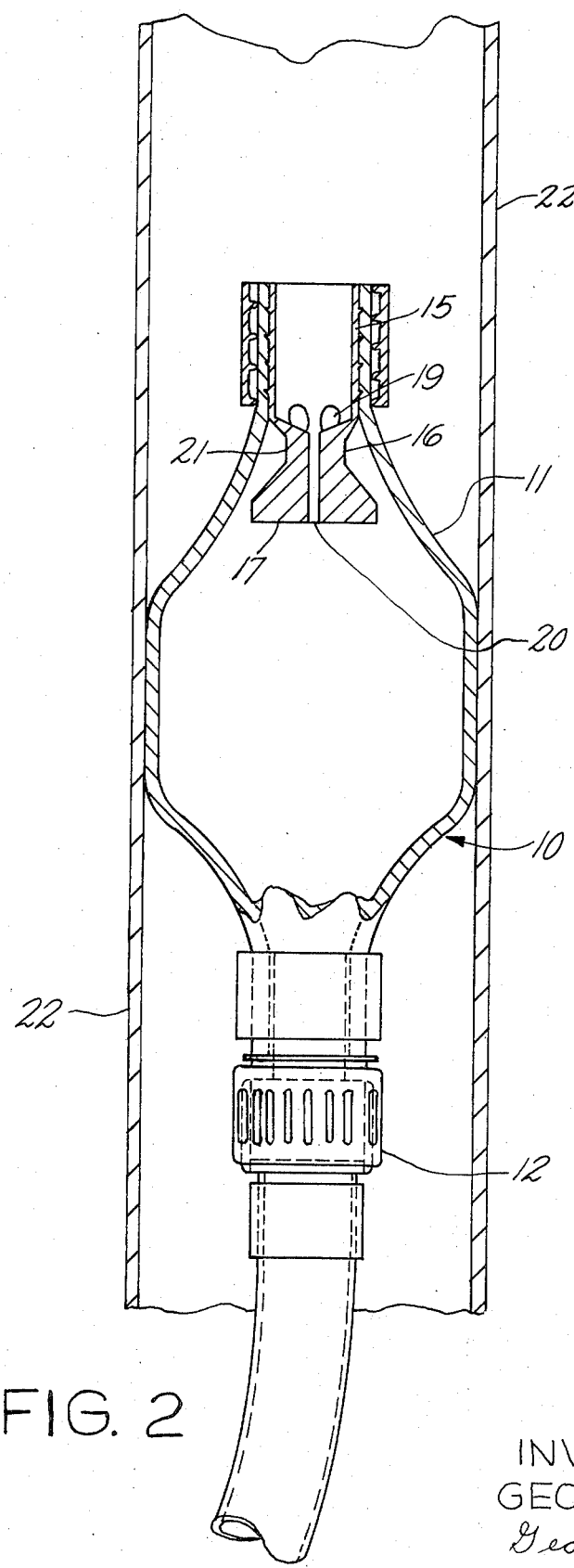
FIG. 2 is a partial cut-away view of the device in its expanded sealing position within a pipe with its valve open.

Referring now to FIG. 2, there is shown the flushing device 10 disposed within a pipe 22 in expanded sealing engagement with the internal diameter thereof. When the water entering the body 11 through the inlet fitting 12 reaches sufficient pressure to expand the body 11, the portion of the body 11 which lies in contact with the circumference of the face plate 17 and the diverging portion of the necked down portion 16 is caused to be expanded away from its contacting engagement and the water within the body 11 is allowed to enter the channel 21 and pass through the plurality of openings 19 into the internal diameter of the outlet portion 15 and thence out into contact with the foreign material blocking the pipe. The pressure of the water impinging against the foreign material blocking the pipe will cause the material to break loose and flow through the pipe, thereby clearing same.

While the invention has herein been shown and described in what is conceived to be the most practical and preferred embodiment, it is recognized that departures may be made therefrom within the scope of the invention, which is to be accorded the full scope of the claims so as to embrace any and all equivalent devices.

I claim:

1. In slidable combination with a conduit, a flushing device comprising:

a tubular elastomeric body adapted to expand laterally of its longitudinal axis against said conduit;

a source of water;

a connecting means secured to one end of said body and adapted to connect said body to said source of water;

a face plate having a diameter larger than the internal diameter of said body, said face plate disposed within said body intermediate its ends and adjacent its free end, said body being laterally expanded by said face plate and lying in contracting engagement with the circumference of said face plate;

support means secured on one end to the free end of said body and on its opposite end to said face plate, said support means having at least one opening therein, whereby when water enters said body from said source, said body expands and upon achieving a predetermined expanded diameter said body moves into spaced relationship to the circumference of said face plate, thereby allowing the entrapped water to flow around said face plate and pass through the opening in said support means and discharge through the free end of said body; and means disposed within said body and connected to opposite ends thereof, whereby said body is prevented from extending longitudinally while being permitted to expand laterally.

2. A flushing device in accordance with claim 1, wherein said face plate has a restrictive orifice extending therethrough, whereby entrapped water within said body is permitted to leak out after incoming water is discontinued, thereby allowing said body to return to its normal diameter in contracting engagement to the circumference of said face plate.

3. In slidable combination with a conduit, a flushing device comprising:

a tubular elastomeric body adapted to expand laterally of its longitudinal axis against said conduit;

connecting means secured to one end of said body and adapted to connect said body to a source of water;

a face plate having a diameter greater than the internal diameter of said body, disposed within said body intermediate its ends, the outer diameter of said body being laterally expanded by said face plate and lying in contracting sealing engagement with the circumference of said face plate, support means secured to said face plate and said body whereby said face plate is held in a fixed position, said support means having at least one opening therein, whereby when water enters said body from the source said body expands and upon achieving a predetermined expanded diameter said body moves into spaced relationship to the circumference of said fixed face plate, thereby allowing the entrapped water to flow around said face plate, pass through the opening in said support means and discharge through the free end of said body.

4. A flushing device in accordance with claim 3, further comprising means disposed within said body and connected to opposite ends thereof for limiting the longitudinal expansion of said body.

5. A flushing device comprising:

a tubular elastomeric body, means for connecting said body to a source of water, a face plate having a diameter greater than the internal diameter of said body, disposed within said body intermediate its ends, said body lying in sealing engagement with the circumference of said face plate;

a spring means secured to said face plate and said body, whereby said face plate is held in a fixed position, said spring means having at least one opening therein, whereby when water enters said body from the source said body expands and upon achieving a predetermined expanded diameter said body moves into spaced relationship to the circumference of said face plate, thereby allowing the entrapped water to flow around said face plate, pass through the opening in said spring and discharge through the free end of said body.

6. A flushing device in accordance with claim 5, wherein said face plate has an orifice extending therethrough, the orifice having a diameter sufficient to allow water within said body to discharge therethrough upon the cessation of incoming water.

7. A flushing device in accordance with claim 5, further comprising a string disposed through said body, said string being secured on one end to one end of said body and on the other end to the opposite end of said body, whereby said body is prevented from elongating beyond the length of said string while being allowed to expand laterally of said string.

* * * * *